Feb. 9, 1965

W. R. HAGGSTROM 3,168,842

INDEXING TABLE

Filed March 16, 1961

WALTER R. HAGGSTROM
INVENTOR

BY Norman S. Blodgett
ATTORNEY

Feb. 9, 1965  W. R. HAGGSTROM  3,168,842
INDEXING TABLE
Filed March 16, 1961  3 Sheets-Sheet 2

INVENTOR
WALTER R. HAGGSTROM
BY
ATTORNEY

Feb. 9, 1965  W. R. HAGGSTROM  3,168,842
INDEXING TABLE
Filed March 16, 1961  3 Sheets-Sheet 3

WALTER R. HAGGSTROM
INVENTOR

BY *Norman S. Blodgett*
ATTORNEY 3,168,842
INDEXING TABLE
Walter R. Haggstrom, Howard Ave., Westminster, Mass.
Filed Mar. 16, 1961, Ser. No. 96,292
12 Claims. (Cl. 74—822)

This invention relates to an indexing table and more particularly to apparatus arranged to rotate an article in pre-determined angular increments.

In the machine tool industry, it is common practice to provide an indexing table for rotating a workpiece relative to tools. In order to bring the tools into a certain pre-determined relationship to the workpiece, the workpiece is sometimes mounted in the center of a cluster of tools and successive incremental movements of the indexing table bring various tools into alignment with certain parts of the workpiece to produce machine operations on those parts. Because of the construction of the previously-known indexing tables, however, it has not been possible quickly to adjust the amount of angular incremental change or to repeat accurately such angular increments. Furthermore, such devices have been very complicated and easily damaged. Also, they have not been capable of electrical control. Other difficulties experienced with the prior art devices have been obviated in a novel manner by the present invention.

It is, therefore, an outstanding object of the invention to provide an indexing table which may be moved through readily adjustable angular increments, which increments may be determined very accurately.

Another object of this invention is the provision of an indexing table making use of a pneumatic rotary actuator.

A further object of the present invention is the provision of an indexing table whose operation is largely electrical and which lends itself readily to electrical control.

It is another object of the instant invention to provide an indexing table in which incremental rotation takes place continuously in one direction without return of the table in the other direction to an initial starting point.

It is a further object of the invention to provide an indexing table whose rotation takes place very smoothly and without sudden stoppage or shock to an article carried by the table.

A still further object of this invention is the provision of an indexing table of simple, inexpensive construction which may be manufactured of readily-obtained material and which is capable of a long life of useful service with a minimum of maintenance.

It is a still further object of the present invention to provide an indexing table having a combination of pneumatic and electrical method of operation.

Another object of the invention is the provision of an electrical-pneumatic indexing table in which the inertia of the table load is taken into consideration in obtaining accurate placement and accurate angular incremental change.

Another object of the invention is to provide an indexing table which may be moved through readily adjustable angles of any angular increment in one cycle, which increments may be determined very accurately.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which.

Figure 1:
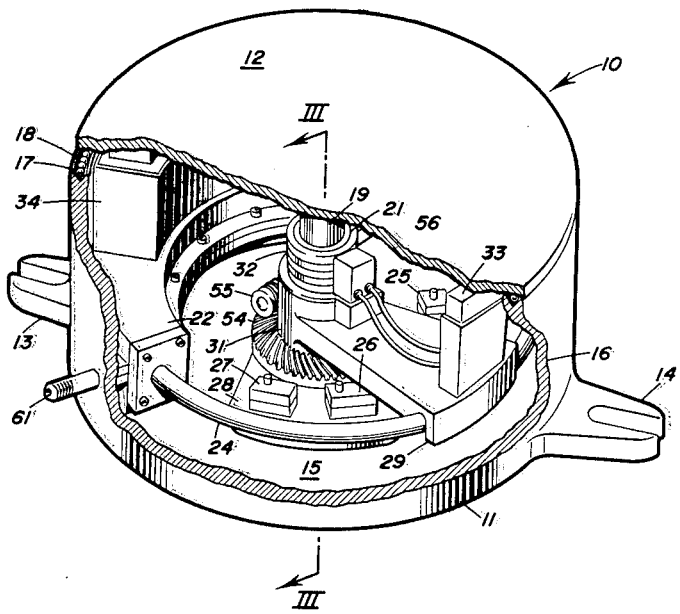
FIG. 1 is a perspective view of an indexing table embodying the principles of the present invention with portions removed for the purpose of clarity of description.

Referring first to FIG. 1, wherein are best shown the general features of the invention, the indexing table, indicated generally by the reference numeral 10, is shown as consisting of a base 11 and a platen 12. The base is provided with slotted ears 13 and 14 by which it may be bolted to the table of a machine tool. The base has a bottom 15 of generally circular form and from its periphery extends a circular wall 16 whose upper edge falls in a single horizontal plane. The said upper edge is provided with a groove 17 of generally upwardly-directed V-shape cross-section which carries a series of balls 18. The platen 12 is generally circular and rests on the balls 18 for generally frictionless rotation. A shaft 19 extends downwardly from the center of the platen 12 and is carried in a sleeve 21 which extends upwardly from the bottom 15 of the base 11. Also mounted on the bottom 15 of the base 11 is an actuator 22 having a body 23 and a piston rod 24. A switch 25 is mounted on the bottom 15 of the base 11 near one end of the body 23 of the actuator. Another switch 26 is mounted on a plate 28 which is rotatably mounted on the sleeve 21 but which is normally located near the other end of the body 23 of the actuator. An arm 29 is provided at one end with a hub 31 which is rotatably carried on the sleeve 21. Mounted on the sleeve 21 above the hub 31 and on the arm 29 is a commutating apparatus 32. Mounted on the outer end of the arm 29 is a magnet 33 and mounted on the body 23 is another magnet 34, the latter being much larger and more powerful than the former.

Figure 2:
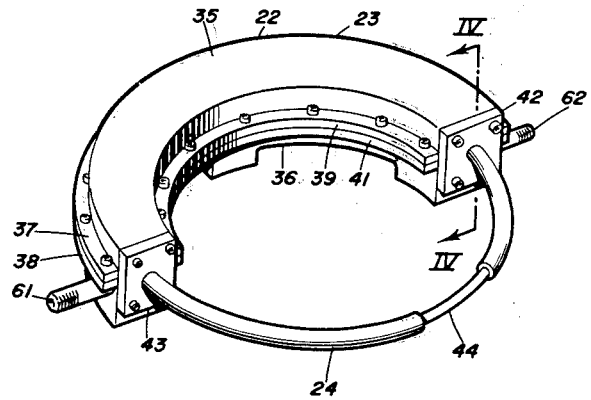
FIG. 2 is a perspective view of a portion of the invention.

In FIG. 2 it can be seen that the body 23 of the actuator 22 is semi-circular in general form and is of a square cross-section. It is provided with an upper portion 35 and a lower portion 36, these portions being provided respectively with flanges 37 and 38 on the outer periphery and with flanges 39 and 41 on the inner periphery. These flanges are bolted together to hold the two halves of the body in a unitary condition. At one end the body is provided with a head 42 and at the other end with a head 43. The piston rod extends from one head to the other and the rod, being a true annulus, occupies almost a complete circle. The rod is connected at its free ends to a piston to be described more fully hereinafter. In its central portion the piston rod is provided with a notch 44 by which it is firmly connected to the outer end of the arm 29.

Figure 3:
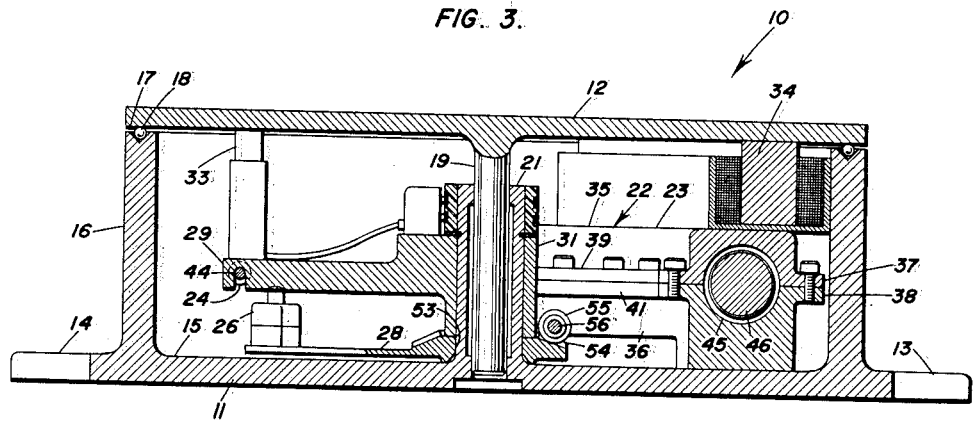
FIG. 3 is a sectional view of the invention taken on the line III—III of FIG. 1.

FIG. 3 shows the relationship of some of the parts. For instance, it shows the manner in which the sleeve 21 extends upwardly from the floor 15 of the base 11 and has rotatably mounted thereon a plate 28, the hub 31 of the arm 29. The manner in which the upper portion 35 and the lower portion 36 of the body 23 are mounted on the base is shown clearly, as is the presence of an annular bore 45 in the body in which is fitted a piston 46.

Figure 4:
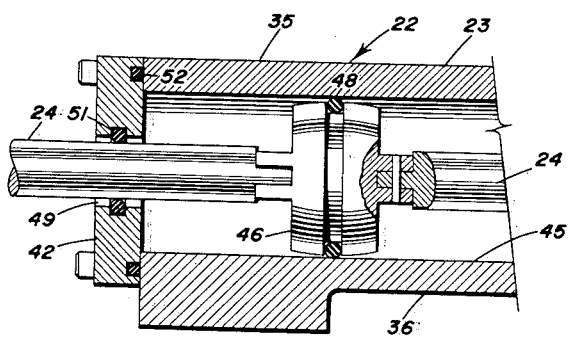
FIG. 4 is a sectional view of a portion of the invention taken on the line IV—IV of FIG. 2.

FIG. 4 shows particularly well the construction of the piston 46; it is formed with a body having the shape of a truncated prolate spheroid having an annular groove in its center periphery in which is mounted an O-ring 48. The piston rod 24 has its ends connected to the ends of the piston. The piston rod extends through a bore 49 in the cylinder head 42 and through a similar bore in the other cylinder head 43. The bore 49 is provided with an annular groove in its central portion and in this groove is mounted an O-ring 51 which fits tightly around the piston rod for sealing. A similar O-ring 52 is used as a seal between the head 42 and the body 23. It will be understood that the head 43 is constructed in a similar manner.

Figure 5:
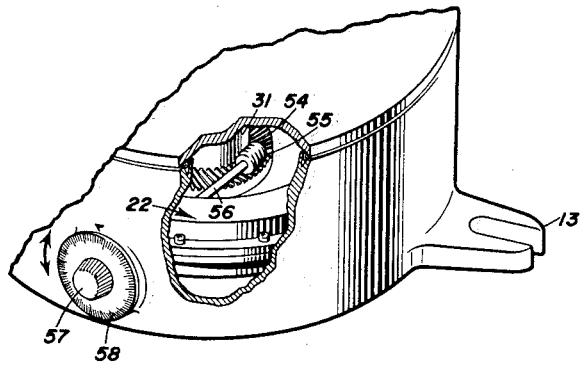
FIG. 5 is a somewhat enlarged perspective view of a portion of the invention with portions broken away.

In FIG. 5 is shown the manner in which the plate 28 carrying the switch 26 is adjustable from the exterior of the base 11. The plate is provided with an aperture 53 at one end adapted to fit snugly around the sleeve 21. Formed in the plate in the area surrounding the aperture 53 are gear teeth 54 which are engaged by a worm 55 formed on the inner end of a shaft 56 which extends through a passage, not shown, through the bottom of the body 23 of the actuator. The outer end of the shaft 56 is mounted in the wall 16 of the base 11 and extends to the outside and is provided with an adjusting knob 57. Suitable indicia 58 are formed on the wall to give an indication of the amount of adjustment and the placement of the plate 28 within the apparatus.

Figure 6:
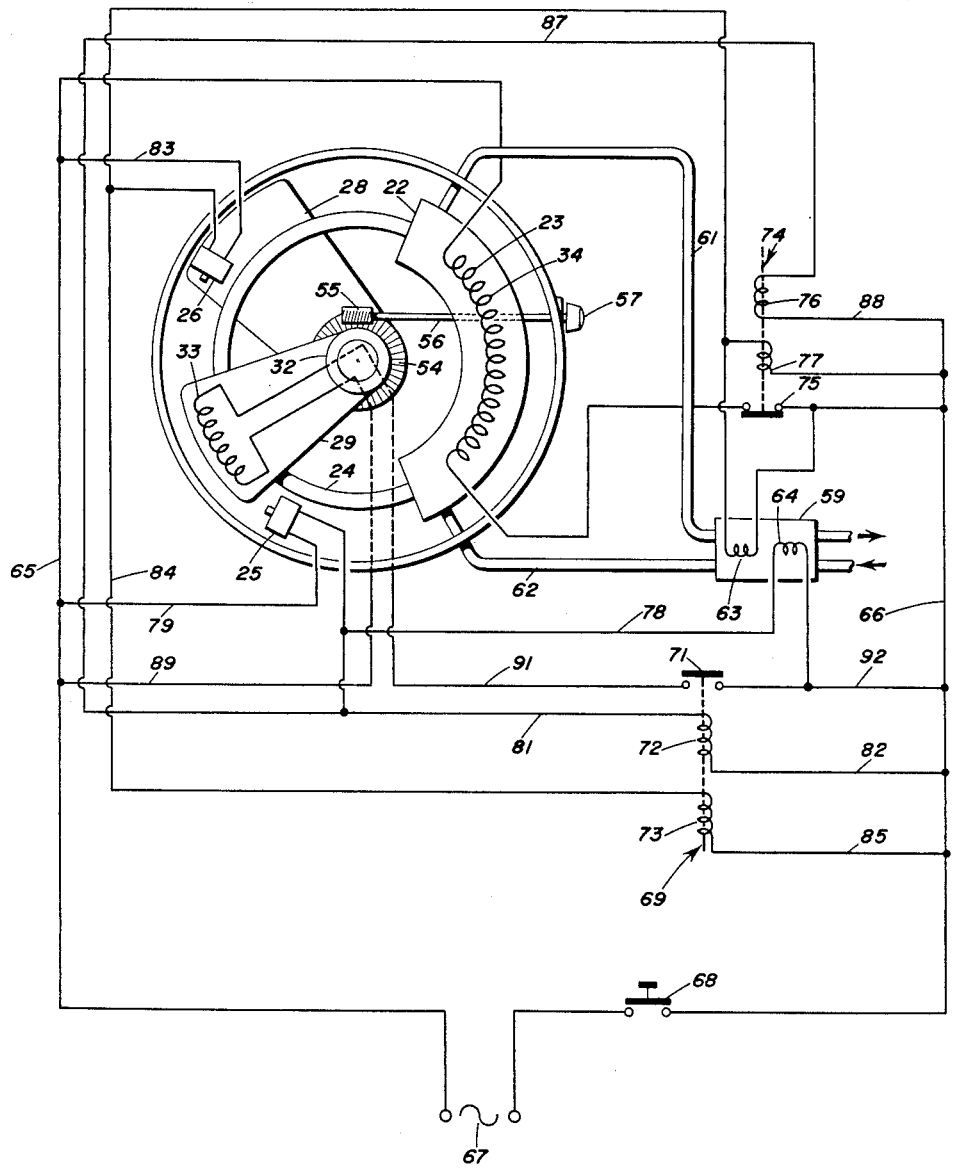
FIG. 6 is a schematic view of the electrical system of the invention.

FIG. 6 shows some of the electrical relationships between coils 33 and 34, the switches 25 and 26, and other elements of a control apparatus associated wtih the mechanical parts of the invention. Solenoid-operated valve 59 is connected through pipes 61 and 62 to the ends of the actuator 22 which is of the pneumatic type. The valve is provided with two actuating coils 63 and 64 which are of such a nature that the energization of one coil will cause pressure air to be supplied to one side of the piston 46 and released from the other side, while the energization of the other coil will reverse the situation. Two main power lines 65 and 66 are connected to an alternating current electrical source 67. The apparatus is supplied with a starter switch 68 in the line 66 and a memory-type relay 69 having a contactor portion 71 which is normally open and two coils 72 and 73. The apparatus is also provided with a memory-type relay 74 having a normally-closed contactor portion 75 and two coils 76 and 77. The coil 64 is connected by a line 78 to a line 87 on one side and at the other side through a line 92 to the power line 66. One side of the switch 25 is connected by a line 79 to the power line 65, while the other side is connected by a line 81 to one side of the coil 72 of the relay 69, the other side of which is connected directly to the power line 66 by a line 82. One side of the switch 26 is connected by a line 83 to the power line 65, while the other side is connected by a line 84 to one side of the coil 73 of the relay 69, the other side of this coil being connected by a line 85 to the power line 66. One side of the coil 76 of the relay 74 is connected by a line 88 to the power line 66 while the other side is connected to the line 87. One side of the smaller electromagnet 33 is connected by a line 89 to the power line 65, while the other side is connected through a line 91 to one side of the contacting portion 71 of the relay 69, the other side of which is connected by the line 92 to the power line 66. It should be noted that the connection of the coil 33 to the lines 89 and 91 takes place through the commutating apparatus 32. The coil 77 of the relay 74 is connected on one side to one side of the switch 26 by a line 90 and on the other side directly to the power line 66.

The operation of the invention will now be readily understood in view of the above discussion. In a general way, the actuator 22, by reciprocating, carries the arm 29 with it. By energizing and de-energizing the magnet 33 and the magnet 34 as this arm moves back and forth, it is possible to rotate the platen 12 relative to the base 11. The angular increments of rotation accomplished by this method are adjustable by adjustment of the plate 28. The introduction of air by way of the pipe 62 into the body 23 of the actuator, while releasing it from the pipe 61, will cause the piston 46 to rotate in the bore 45 in a counter-clockwise direction, as the apparatus is viewed in FIG. 6. The arm 29 will, therefore, move counterclockwise at that time. If, however, the pressure air is introduced through the pipe 61, and air is released through the pipe 62, the operation would be in a clockwise direction. The O-ring 48 of the piston 46 assures an air tight operation despite imperfections in the bore 45. The use of the O-ring 51 as a seal in the heads 42 and 43 assures that, despite the annular characteristics of the piston rod 24, there is no leakage around the piston in the bore 49. It should be noted that the body is oval-shaped and no problem of very accurate fitting of piston and cylinder is presented. In the preferred embodiment, the clockwise rotation of the apparatus is the direction which will actually carry the load, while the counter-clockwise rotation will be unloaded; that is to say, the platen and anything attached to the platen will not be moving during counter-clockwise movement of the piston, but will be held by the magnet 34 in the postion to which it has been taken by the magnet 33. A cycle will be initiated by pressing the starter button 68. The arm 29 will move in a direction determined by the setting of the valve 59, which in turn is determined by the condition of the memory-type or latching relays 74 and 69. Assume that the valve 59 is in a position such that air pressure is introduced through the pipe 61 to the actuator 22 while air is released through the pipe 62. This causes the piston 46 to move in a clockwise direction in its bore 45 and this carries the piston rod 24 and the arm 29 in a clockwise direction. It is the nature of the relay 74 and the relay 69 that, when one coil is actuated, the switch is open and stays open until the other coil is energized, at which time the switch closes and remains closed. At the beginning of the counter-clockwise rotation of the arm 29, it strikes the switch 25 which causes current to pass through the coil 72. This has the effect of closing the contactor portion 71 and causing current to pass through the magnet 33. At the same time, through the line 87 a current is introduced to the coil 76. When the magnet is energized and the arm 29 is moving clockwise, it carries the platen with it. The coil, as is shown in FIG. 1, is mounted in a casing; it is slidable vertically and is pressed upwardly by coil springs so that it contacts the platen 12 very lightly. The magnet 34 is constructed in the same way. At this time the magnet 34 is not energized and it does not brake or hold the platen; therefore, the platen rotates with the arm 29. Eventually, the arm reaches the switch 26 and closes it. This causes current to pass through the coil 73 and reverse the relay 69. At this time the switch 25 is open and there is no energization on the coil 64. The opening of the relay 69 also releases the energization of the magnet 33 so that it no longer holds the platen. The closing of the switch 26 also causes the energization of the coil 77 of the relay 74 so that the contactor portion 75 is actuated to closed position. This causes current to pass through the electro-magnet 34 from the power line 65 through the contacting portion 75 of the relay 74 to the power line 66. The energization of this electro-magnet causes the platen to stop immediately and it is held in that position. The energization of the coil 77 causes another series of events to take place because of the closing of the contacting portion 75. It causes current to pass through the coil 63 of the pneumatic solenoid valve 59 and this causes the valve to assume a condition such that pressure air is introduced through the pipe 62 and released through the pipe 61, so that the actuator moves in a counter-clockwise direction carrying the piston rod 24 and the arm 27 with it. The arm 27, therefore, moves in a counter-clockwise direction. Eventually, it closes the switch 25 and energizes the coil 72 of the relay 69, thus reversing its condition; that is to say, it closes the contacting portion 71 and places the apparatus in condition for a repetition of the cycle. The cycle may be automatically repeated until a series of cycles is interrupted for some reason or other. The angular increment moved during each cycle is determined by the position of the switch 26 which is mounted on the plate 24 and, therefore, is adjustable around the sleeve 21. The adjustment is brought about by the rotation of the shaft 56 by means of the knob 57 and by the engagement of the worm 55 with the gear teeth 54. Since the switches 25 and 26 will usually be of the microswitch type, very great accuracy in angular adjustment can be accomplished. Since, at the end of the cycle, the platen with its load is stopped only by the magnet 34, it must be quite powerful; however, because its acceleration is no problem, it is only necessary to use a small magnet for the magnet 33.

If the indexing table of the invention is used with a machine tool in which the tools are grouped in a circle around a workpiece mounted on the platen, it is possible to perform a machine operation while the arm 27 is returning and the platen does not rotate. If the period of return time is not great enough, a limit switch may be placed in the line 65 or the line 66 so that, even though the apparatus is in condition for the start of a new cycle, it will not start until the limit switch is closed. This would take place when one of the portions of the machine reaches a predetermined condition; this might be when a drill reached a certain depth, for instance, or when a tool is retracted from a machining operation. At that time, the closing of the limit switch would indicate that the tools were all removed from the workpiece and that it would be safe for an indexing cycle to take place. The construction is such that, the moment the coil 33 is deenergized by the closing of the switch 26, reversing air pressure is placed on the actuator 22 so that the magnet 34 is assisted in braking the rotation of the platen 12. It will be understood that at the start of the cycle, the arm 27 is situated slightly counterclockwise of the switch 25 and the magnet 34 is energized while the magnet 33 is not. The energization of the coil 64 of the valve 54 starts the clockwise motion of the arm and soon thereafter it strikes the switch 25, thus energizing the magnet 34 and picking up the platen and carrying it with it. It is contemplated that an automatic actuator, such as a servomotor, might be attached to the shaft 56 to change the position of the switch 26 from one portion of a machining operation to another so that the platen may be moved through a pattern of predetermined increments which may vary from one to another. With such automatic control of the successive increments of rotation it would be possible to control a machining cycle from a tape control or the like.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An indexing table, comprising a base, a platen rotatably mounted on the base, a pneumatic actuator operatively connected between the base and the platen for relative rotation therebetween, the actuator including a body member having an annular bore, a piston slidably carried in the bore, and a curved piston rod connected to the piston.

2. An indexing table, comprising a base, a platen rotatably mounted on the base, an actuator operatively connected between the base and the platen for producing relative rotation therebetween, the actuator including a first magnet having an operative portion located close to the platen for producing the movement thereof, and a second magnet mounted on the base and having an operative portion located close to the platen for stopping the movement thereof.

3. An indexing table, comprising a base, a platen rotatably carried on the base, a pneumatic actuator, the actuator including a body mounted on the base and a piston rod slidable in the body, a first magnet fixedly connected to the piston rod and having an operative portion located close to the platen for producing rotation thereof relative to the base, and a second magnet fixedly connected to the base and having an operative portion located close to the platen for stopping rotation thereof.

4. An indexing table comprising a base, a platen rotatably carried on the base, a pneumatic actuator, the actuator including a body mounted on the base and a piston rod slidable in the body, a first magnet fixedly connected to the piston rod and having an operative portion located close to the platen for producing rotation thereof relative to the base, a second magnet fixedly connected to the base and having an operative portion located close to the platen for stopping rotation thereof, a first switch for deenergizing the first magnet, a second switch for energizing the second magnet, the first and second switches being mounted on a plate, and means for adjusting the plate for adjusting the amount of rotation of the platen relative to the base.

5. An indexing table, comprising a base, a platen rotatably mounted on the base, a pneumatic actuator operatively connected between the base and the platen for relative rotation therebetween, the actuator including a body member having an annular bore, a piston slidably carried in the bore, a curved piston rod connected to the piston, the body being mounted on the base, the first magnet mounted on the piston rod and having an operative portion located close to the platen for producing the movement thereof, and a second magnet mounted on the base and having an operative portion located close to the platen for stopping the movement thereof.

6. An indexing table, comprising a base, a platen rotatably carried on the base for rotation about an axis, a pneumatic actuator, the actuator including a body mounted on the base and a piston rod slidable in the body in a curved path about the said axis, a first magnet fixedly connected to the piston rod and having an operative portion located close to the platen for producing rotation thereof relative to the base, and a second magnet fixedly connected to the base and having an operative portion located close to the platen for stopping rotation thereof.

7. An indexing table, comprising a base, a platen rotatably carried on the base, a pneumatic actuator, the actuator including a body mounted on the base and a piston rod slidable in the body, a solenoid valve for reversing air connections to the actuator to produce sliding of the piston rod, a first magnet fixedly connected to the piston rod and having an operative portion located close to the platen for producing rotation thereof relative to the base during reciprocation of the actuator in one direction only, and a second magnet fixedly connected to the base and having an operative portion located close to the platen for stopping rotation thereof during reciprocation of the actuator in the other direction.

8. An indexing table, comprising a base, a platen rotatably carried on the base, a pneumatic actuator, the actuator including a body mounted on the base and a piston rod slidable in the body, a first magnet fixedly connected to the piston rod and having an operative portion located close to the platen for producing rotation thereof relative to the base, a second magnet fixedly connected to the base and having an operative portion located close to the platen for stopping the rotation thereof, a first switch for energizing the first magnet, a second switch for de-energizing the first magnet, and a third switch for energizing the second magnet, the second and third switches being mounted on a common plate which is adjustable along the path of the actuator.

9. An indexing table, comprising a base, a platen carried on the base for rotation about an axis, a pneumatic actuator, the actuator including a body mounted on the base and a piston rod slidable in the body in a curved path about the said axis, a solenoid valve for reversing air connections to the actuator to produce sliding of the piston rod, a first magnet fixedly connected to the piston rod and having an operative portion located close to the platen for producing rotation thereof relative to the base during reciprocation of the actuator in one direction only, and a second magnet fixedly connected to the base and having an operative portion located close to the platen for stopping the rotation thereof during reciprocation of the actuator in the other direction.

10. An indexing table, comprising a base, a platen rotatably carried on the base, a pneumatic actuator, the actuator including a body mounted on the base and a piston rod slidable in the body, a solenoid valve for reversing air connections to the actuator to produce sliding of the piston rod, a first magnet fixedly connected to the piston rod and having an operative portion located close to the platen for producing rotation thereof relative to the base during reciprocation of the actuator in one direction only, a second magnet fixedly connected to the base and having an operative portion located close to the platen for stopping rotation thereof during reciprocation of the actuator in the other direction, a first switch for energizing the first magnet, a second switch for de-energizing the first magnet, and a third switch for energizing the second magnet, the second and third switches being mounted on a common plate which is adjustable along the path of the actuator.

11. An indexing table, comprising a base, a platen carried on the base for rotation about an axis, a pneumatic actuator, the actuator including a body mounted on the base and a piston rod slidable in the body in a curved path about the said axis, the first magnet fixedly connected to the piston rod and having an operative portion located close to the platen for producing rotation thereof relative to the base, a second magnet fixedly connected to the base and having an operative portion located close to the platen for stopping rotation theref, a first switch for energizing the first magnet, a second switch for de-energizing the first magnet, a third switch for energizing the second magnet, the switches being arranged for engagement by the actuator, and a plate on which the second and third switches are mounted, which plate is adjustable along the path of the actuator.

12. An indexing table, comprising a base, a platen carried on the base for rotation about an axis, an oscillatable pneumatic actuator, the actuator including a body mounted on the base and a piston rod slidable in the body in a curved path about the said axis, a solenoid valve for reversing air connections to the actuator to produce reciprocations thereof, a first magnet fixedly connected to the piston rod and having an operative portion located close to the platen for producing rotation thereof relative to the base during reciprocation of the actuator in one direction only, a second magnet fixedly connected to the base and having an operative portion located close to the platen for stopping rotation thereof during reciprocation of the actuator in the other direction, a first switch for energizing the first magnet, a second switch for de-energizing the first magnet, a third switch for energizing the second magnet, the switches being arranged for engagement by the actuator, and a plate on which the second and third switches are mounted, which plate is adjustable along the path of the actuator.

References Cited in the file of this patent

UNITED STATES PATENTS

| | | |
|---|---|---|
| Re. 24,440 | Groeu | Mar. 4, 1958 |
| 912,124 | Hanson | Feb. 9, 1909 |
| 2,440,916 | Rusnak | May 4, 1948 |
| 2,544,122 | Abbott | Mar. 6, 1951 |
| 2,573,506 | Stokes | Oct. 29, 1951 |
| 2,657,538 | Myers | Nov. 3, 1953 |
| 2,672,383 | Hamer | Mar. 16, 1954 |
| 2,871,727 | Malick | Feb. 3, 1959 |
| 2,954,701 | Berill | Oct. 4, 1960 |
| 2,965,824 | Hirtreiter | Dec. 20, 1960 |

FOREIGN PATENTS

| | | |
|---|---|---|
| 21,055 | Switzerland | Dec. 31, 1900 |
| 212,598 | Germany | Aug. 3, 1909 |
| 866,420 | Germany | Feb. 9, 1953 |